United States Patent [19]
Germer

[11] 3,876,256
[45] Apr. 8, 1975

[54] WHEEL APPARATUS
[75] Inventor: John A. Germer, Doylestown, Pa.
[73] Assignee: The Budd Company, Troy, Mich.
[22] Filed: Feb. 15, 1974
[21] Appl. No.: 442,997

[52] U.S. Cl. ............................ 301/13 SM; 301/13 R
[51] Int. Cl. ............................................. B60b 23/10
[58] Field of Search .... 301/10 R, 11 R, 12 R, 13 R, 301/13 SM

[56] References Cited
UNITED STATES PATENTS
3,090,649  5/1963  Walther ......................... 301/13 SM
3,421,797  1/1969  Walther ......................... 301/13 SM FOREIGN PATENTS OR APPLICATIONS
539,050  7/1930  Germany ....................... 301/13 SM Primary Examiner—M. Henson Wood, Jr.
Assistant Examiner—Reinhard J. Eisenzopf

[57] ABSTRACT

A demountable rim-type wheel includes a main wheel and a rim dimensioned to fit over the wheel and held in place by clamps. The rim and clamps include perpendicular stop portions to limit the inward movement of the rim when it is mounted to the wheel to improve the alignment of the rim after mounting.

6 Claims, 9 Drawing Figures

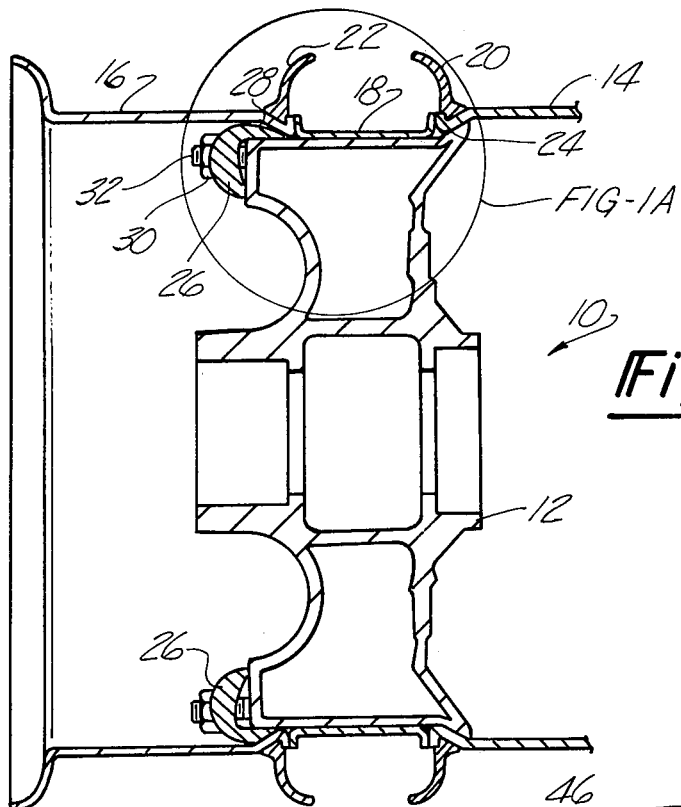
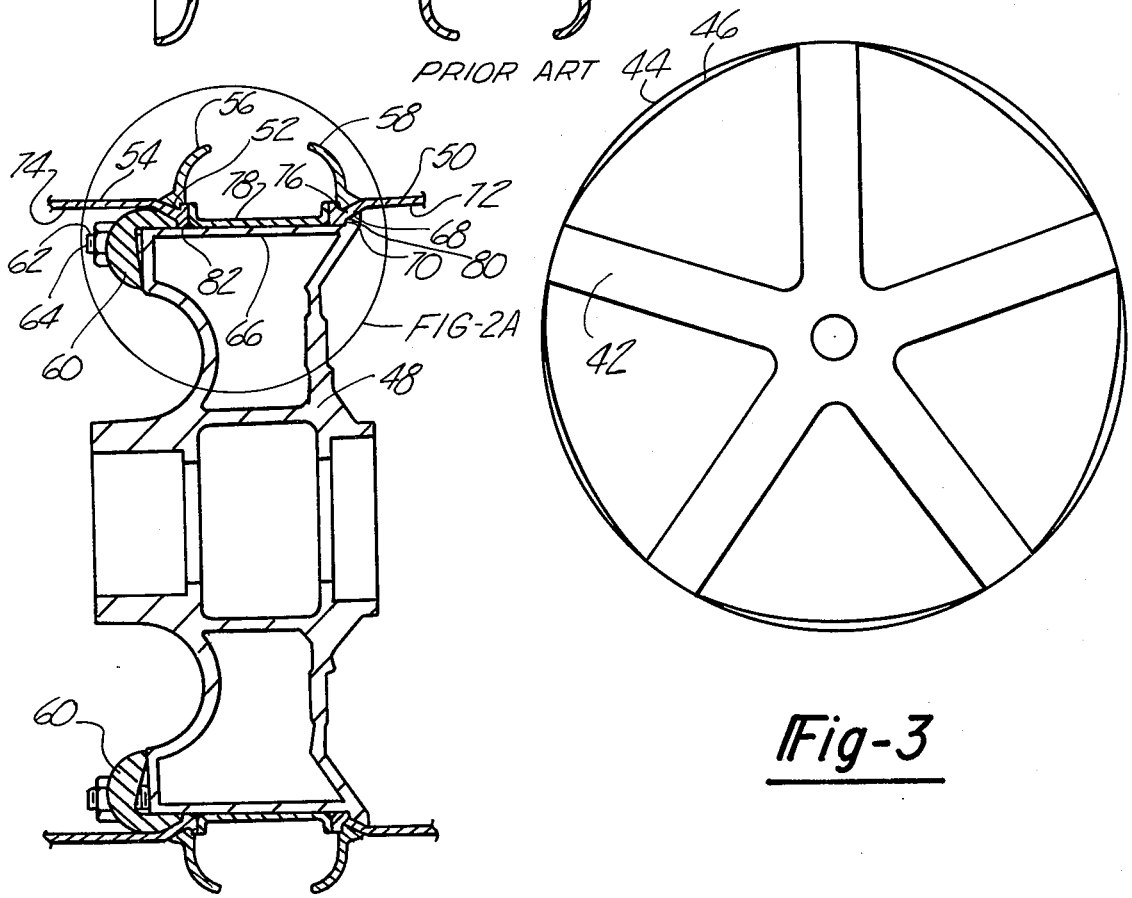
Fig-1
Fig-1A
PRIOR ART
Fig-2
Fig-2A
Fig-3

WHEEL APPARATUS

A large number of trucks and trailers use demountable rim-type wheels. For the most part, the rim and wheel have a tapered or conical edges with the rim being slipped over the wheel and held to the tapered edge by means of several clamps. In the case of dual wheels, a spacer is set between the first and second wheel. The clamps used for clamping the rim unto the wheel also generally include tapered portions of the same angle as the wheel edge.

The purpose of the tapered interfaces between the clamps, rim and wheel is to assure good contact area between the wheel and rim without the necessity of close fitting parts which would tend to make mounting difficult. The conical surfaces also facilitate the concentric mounting of the rim with respect to the wheel.

If the rim is not carefully mounted to the wheel and checked after mounting, the tire, or tires, mounted to the rims may have considerable lateral or radial runout. One reason for this is that when a clamp is drawn up tight on a spoke wheel, for example, the rim will be pulled up high in the conical section of the spoke on the wheel. When a clamp on the opposite side of the rim is tightened, the latter clamp is unable to pull the rim as far up the conical section as the first clamp. Under the conditions described, the radius from the center line of the axle of the wheel may be longer to the section of the rim first tightened than to the section of the rim tightened second. Furthermore, the plane of the mounted rim will not be perpendicular to the center line of the axle of the wheel.

Runout causes considerable problems in riding. Wheel wabble and vibration resulting from runout result in less efficient steering on the front wheels, reduced driver comfort, increased tire wear, reduced fuel mileage, and greater wear on the wheel bearing and drive train.

In a typical spoke wheel, if the clamps are tightened too much, the contact areas are increased in diameter at the expense of flattening the arc between the spokes. This condition is called "chording." When chording occurs, the rim is not circular and, therefore, an additional source of vibration is introduced. If excessive chording is forced into the rim, the rim may be permanently distorted and thereafter never run true.

It is an object of this invention to provide an improved wheel arrangement wherein radial and lateral "runout" are minimized.

It is a further object of this invention to provide an improved wheel arrangement wherein "chording" is minimized.

It is still a further object of this invention to provide an improved wheel and rim arrangement wherein the rim may be used with different types of wheels.

In accordance with the present invention, a demountable rim-type wheel includes a main wheel dimensioned to receive a rim. The wheel, rim and mounting clamps include conical and perpendicular stop surfaces. When the clamps are attached to mount the rim to the wheel, the perpendicular surfaces limit the inward movement of the rim.

Other objects and advantages of the present invention will be apparent and suggest themselves skilled in the art, from a reading of the following specification and claims, in conjunction with the accompanying drawings, in which:

FIG. 1 is a cross-sectional view of a dual-wheel arrangement of the type used in the prior art;

FIG. 2 is a cross-sectional view of a dual-wheel arrangement illustrating the present invention;

FIG. 3 is a diagrammatical view of a spoke wheel on a rim shown for the purpose of illustrating "chording;"

Figure 1A:
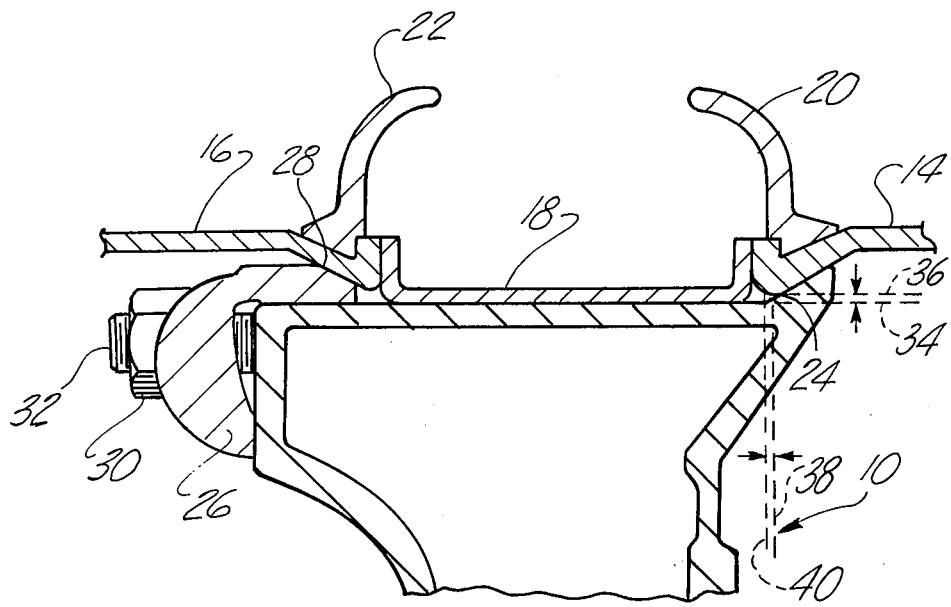
FIG. 1a is an enlarged portion of a section 1a illustrated in FIG. 1.

Referring to FIGS. 1 and 1a, a dual-wheel arrangement 10 includes a main wheel member 12 dimensioned to receive an inboard rim 14 and an outboard rim 16. An angular spacer member 18 is interposed between the rims 14 and 16 to assure proper spacing between the inboard and outboard tires when they are mounted to the rims. Ring members 20 and 22 are attached to the rims 14 and 16 in a conventional manner.

In assembling the dual-wheel arrangement, the rim 14 is first fitted over the cylindrical surface portion of the wheel member 12. The spacer member 18 is then placed in position around the wheel member 12. The rim 16 is fitted over the wheel member 12 and the various parts involved are ready to be clamped together by means of a plurality of clamps 26. The rings 20 and 22 are inserted after all the parts of the wheel have been assembled.

Each of the clamps 26 has a tapered conical surface 28 having substantially the same angle as an inwardly extending tapered conical surface 24 on the wheel member 12. The purpose of the tapered interfaces is to assure good contact area between the wheel and rim without the necessity of close fitting parts which would make the mounting difficult. The conical surfaces facilitate the concentric mounting of the rim on the wheel.

Consider a situation where all the parts are in place and the top clamp 26 is secured to the wheel member 12. If the top clamp is drawn up tight on the wheel member 12 by means of tightening the nut 30 over the treaded element 32 which is fixed to the wheel member, the rim 14 will be pushed high up on the conical surface 24 of the wheel member 12. Likewise, the rim 16 will be pushed high up on the conical surface 28 of the clamp 26. When the lower clamp 26 is drawn tight on the wheel member 12, it is unable to pull the rims 14 or 16 too far up the conical portion 24 of the wheel 12 or the conical portion 28 of the clamp 26.

As illustrated in FIG. 1a, when the top clamp 26 is tightened prior to the tightening of the bottom clamp 26, the radius of the rims from the center line of the axle is longer to the first section tightened than to the second section tightened. Further, planes of the rims will not be perpendicular to the center line of the axle. Lines 34 and 36 in FIG. 1a illustrate that the rims in the top portions are higher on the wheel as compared with the portions of the rim on the lower side of the wheel. This discrepency in distance causes radial runout of the wheel during operation. Likewise, lines 38 and 40 illustrate the distance that the upper portions are displaced laterally with respect to the lower portions of the rim. This causes lateral runout during operation.

As is well known in the art, runout causes wheel wobble and vibration which adversely affect the steering of the front wheels. Runout also causes tire wear, reduced fuel mileage, and greater wear on the wheel bearing and drive train. As illustrated in FIGS. 1 and 1a, subsequently applied, if clamps 26 are made too tight after excessive tightening of the first applied clamp, the contact areas between the subsequently tightened clamps and the rims may be increased in diameter at the expense of flattening the arc between spokes of a wheel, as illustrated in FIG. 3, A spoke wheel 42 is diagrammatically illustrated with a rim 44 mounted thereon. If excessive tightening of the clamps takes place, the rim 44 will be flattened somewhat in the shape of line 46. This "chording" resulting from a non-circular rim provides an additional source of vibration in the wheel system. If excessive "chording" is forced into the rim, the rim may be permanently distorted.

Figure 2A:
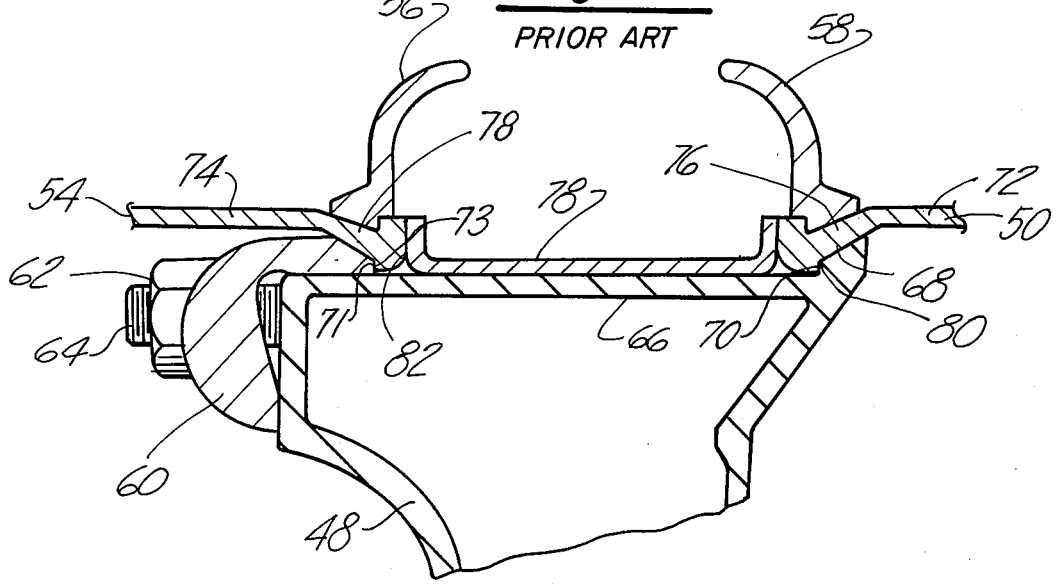
FIG. 2a is an enlarged portion 2a illustrated in FIG. 2.

Referring particularly to FIGS. 2 and 2a, the basic wheel and rim arrangement is similar to that illustrated in FIGS. 1 and 1a, except that the rim and wheel have been modified in accordance with the present invention. A wheel member 48 is dimensioned to receive a rim 50, a spacer element 78 and a rim 54. Conventional rings 56 and 58 are provided after final assembly. The assembly is held in place by means of a plurality of clamps 60. The clamps are tightened onto the wheel by means of nuts 62 engaging threaded elements 64 fixed to the wheel member 48.

The wheel member 48 includes a main outer cylindrical portion 66 and an outwardly extending conical surface 68 disposed along the edge of the wheel member. A flat portion 70 is disposed between the conical surface 68 and the cylindrical surface 66 and is perpendicular to the cylindrical surface 66. The clamps 60 also include flat portions 71 which are perpendicular to the cylindrical portion 66 when mounted to the wheel member 48.

The rims 50 and 54 include inner cylindrical surfaces 72 and 74, respectively. The edges of the rims 50 and 54 include inwardly extending conical surfaces 76 and 78, respectively. Extending from the conical surfaces 76 and 78 are flat surfaces 80 and 82 perpendicular to the cylindrical surfaces 72 and 74, respectively.

When the upper clamp 60 is applied to the wheel 48, the conical surface 76 of the rim 50 rides up the conical surface 68 of the wheel member 48. The perpendicular surface 80 of the rim 50 engages the perpendicular surface 70 of the wheel member 48. This limits the travel of the rim 50. The surface 71 of the clamp 60 also contacts the portion 73 thereby limiting the inward movement of the clamp 60 and rim 54. The upper clamp 60 may be tightened only up to a certain point as determined by the perpendicular or stop surfaces of the wheel member, rim and clamp. As a result, the lower clamp 60, as well as the other subsequently added clamps, may be secured to clamp the rims to the wheel member 48 without the misalignment illustrated in connection with FIG. 1. The result is that the lateral and radial runout is greatly minimized.

One of the features of the present invention is the interchangeability of the rims and wheel involved. For example, a conventional rim may be used with a wheel member modified in accordance with the invention and a conventional wheel may be used with a rim modified in accordance with the invention.

Figure 4:
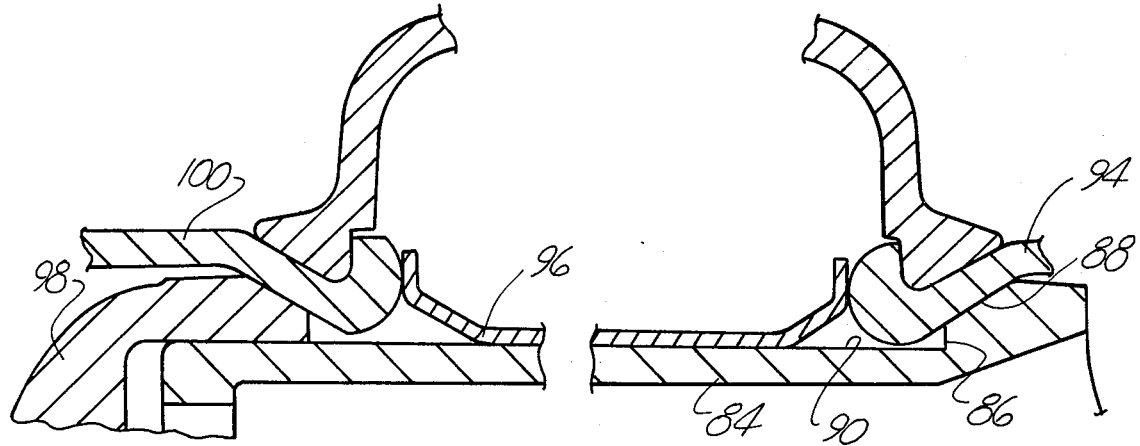
FIG. 4 is a cross-sectional partial view of a dual-wheel arrangement wherein the wheel is modified in accordance with the present invention but is used with a conventional rim.

Referring particularly to FIG. 4, a dual wheel arrangement involving a wheel modified in accordance with the present invention is illustrated with use with a pair of conventional rims. The wheel 84 may be similar to the wheel 48 illustrated in FIG. 2. A perpendicular portion 86 is located between a conical portion 88 and a flat cylindrical portion 90 of the wheel. A pair of rims 92 and 94 are spaced by means of a spacing member 96. While the alignment feature discussed in connection with FIG. 2 will not be realized in the arrangement of FIG. 4, the modified wheel 94 may still be used with conventional rims where the entire assembly is clamped into place by means of a plurality of clamps such as clamp 98.

Figure 5:
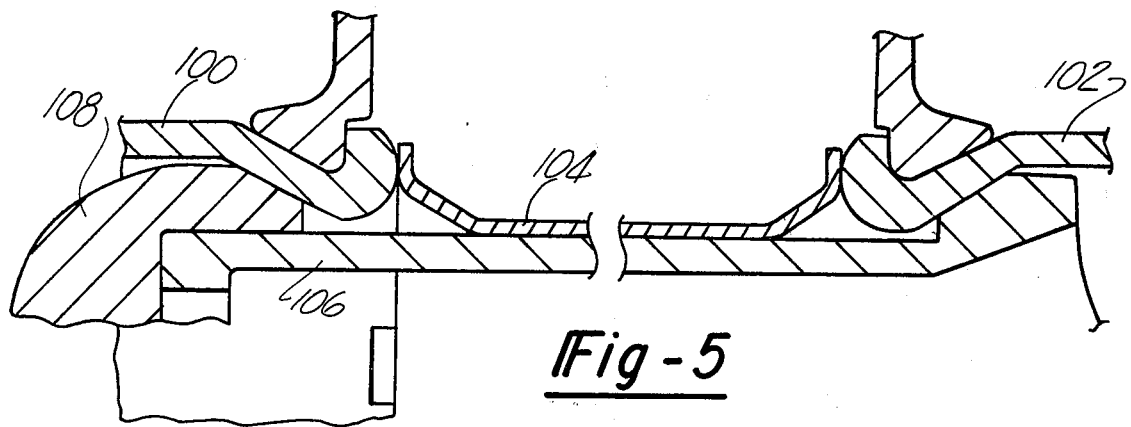
FIG. 5 is a partial cross-sectional view of a dual-wheel arrangement wherein a rim modified in accordance with the present invention is used with an unmodified conventional wheel.

Referring particularly to FIG. 5, modified rims 100 and 102 spaced by a space member 104 are mounted to the wheel 106 by means of clamps 108. While the rim portions illustrated in the FIG. 5 show conventional rims, outset portions of the rims illustrated by dotted lines 101 include flat spaced perpendicular sections. This particular feature is more clearly illustrated in FIG. 7, where the perpendicular portions of the rim are outset with respect to the wheel.

Figure 6:
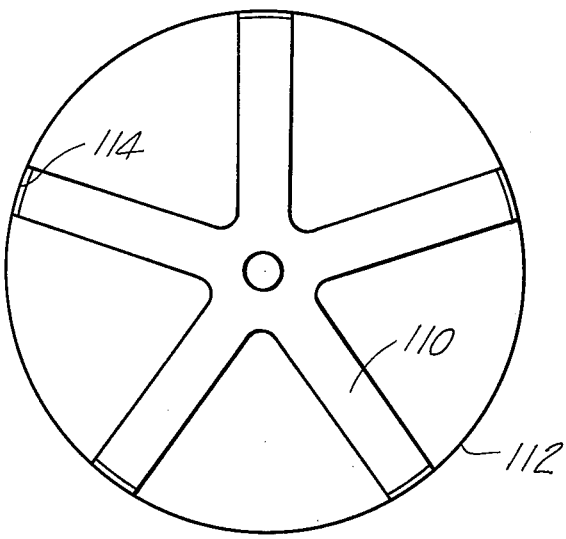
FIG. 6 is a diagrammatical view illustrating a rim on a wheel on which both rim and wheel are modified in accordance with the present invention.

Referring particularly to FIG. 6, a spoked wheel 110 and a rim 112 modified with the perpendicular portions previously described are illustrated. The modifications to the rim, such as by adding welded material 114, include perpendicular portions designed to engage the perpendicular end portions of the spokes of the wheel 110 to permit improved alignment as previously described.

Figure 7:
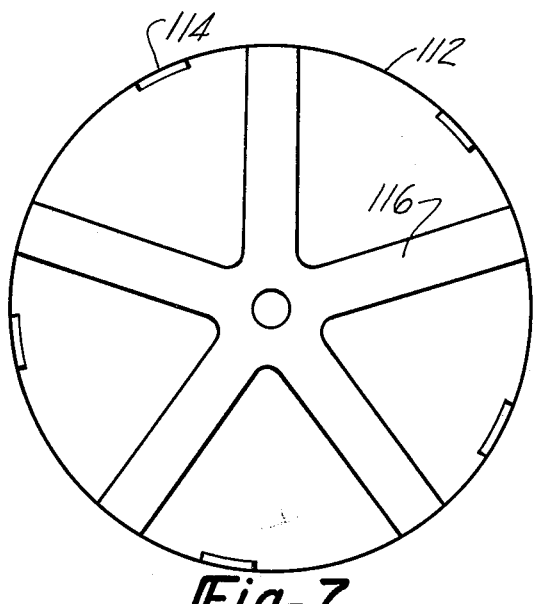
FIG. 7 is a diagrammatical view illustrating a rim made in accordance with the present invention with an unmodified conventional spoke wheel.

Referring particularly to FIG. 7, the same rim 112 illustrated in FIG. 6 including the built-up portions 114 is illustrated with a conventional spoked wheel 116. The built-up portions 114 are outset with respect to the ends of the spokes of the wheel 116 and therefore will be mounted to the wheel in a conventional way, such as described in connection with FIGS. 1 and 5.

Consequently, it is seen that the rim modified in accordance with the present invention may be used with the modified wheel 110 or with a conventional wheel 116. This provides great versatility to the various rims and wheels used in the present invention making it possible for the wheels or rims to be used with the millions of wheels and rims already on the market.

While the present invention has been described in connection with a dual-wheel arrangement, the alignment feature involving perpendicular stop portions may also be applied to a demountable single rim for holding a single tire. The rim would be modified so that its inboard edge would include a flat section to engage a perpendicular flat section of the wheel. The outboard edge of the rim would include stop and conical surfaces to be engaged by clamps as described in connection with FIG. 2.

What is claimed is:

1. A demountable rim-type wheel comprising a main wheel member with a plurality of spokes extending therefrom, said spokes having main external end surfaces, outwardly extending conical surfaces, and a plurality of flat surfaces perpendicular to said end surfaces between said conical and end surfaces, a rim dimensioned to fit over said wheel member, said rim including an internal cylindrical surface, a rim flat surface perpendicular to said internal cylindrical surface, and an inwardly extending conical surface between said flat surface and said internal cylindrical surface, means for clamping said rim to said wheel member with said inwardly and outwardly extending conical surfaces engaging each other as said rim is mounted to said wheel member with said plurality of flat surfaces in contact with said rim flat surface limiting the inward movement of said rim when said rim is mounted to said wheel member.

2. A demountable rim-type wheel as set forth in claim 1 wherein said means for clamping comprises clamp elements having inwardly extending conical surfaces disposed to engage said second conical surface of said rim when said rim is mounted to said wheel member.

3. A demountable rim-type wheel is set forth in claim 2 wherein a pair of inboard and outboard rims separated by a spacer member is mounted to said wheel member, each of said inboard and outboard rims including an interior cylindrical surface, an inwardly extending conical surface and a flat surface perpendicular to said last mentioned interior cylindrical surface.

4. A demountable rim-type wheel as set forth in claim 3 wherein said clamp elements include portions perpendicular to the cylindrical surface of said wheel, with at least one of said portions engaging the flat surface of said outboard rim to limit the inward movement of said at least one of said clamp elements when said outboard rim is mounted to said wheel member.

5. A demountable rim-type wheel as set forth in claim 4 wherein said conical surface of said inboard rim engages said conical surface of said wheel member and said perpendicular portions of said inboard rim and said wheel member engage each other when said outboard rim is mounted to said wheel member.

6. A demountable rim type wheel as set forth in claim 5 wherein the conical surface of said clamps engage the inwardly extending conical surface of said outboard rim when said outboard rim is mounted to said wheel member.

* * * * *